Patented Feb. 3, 1931

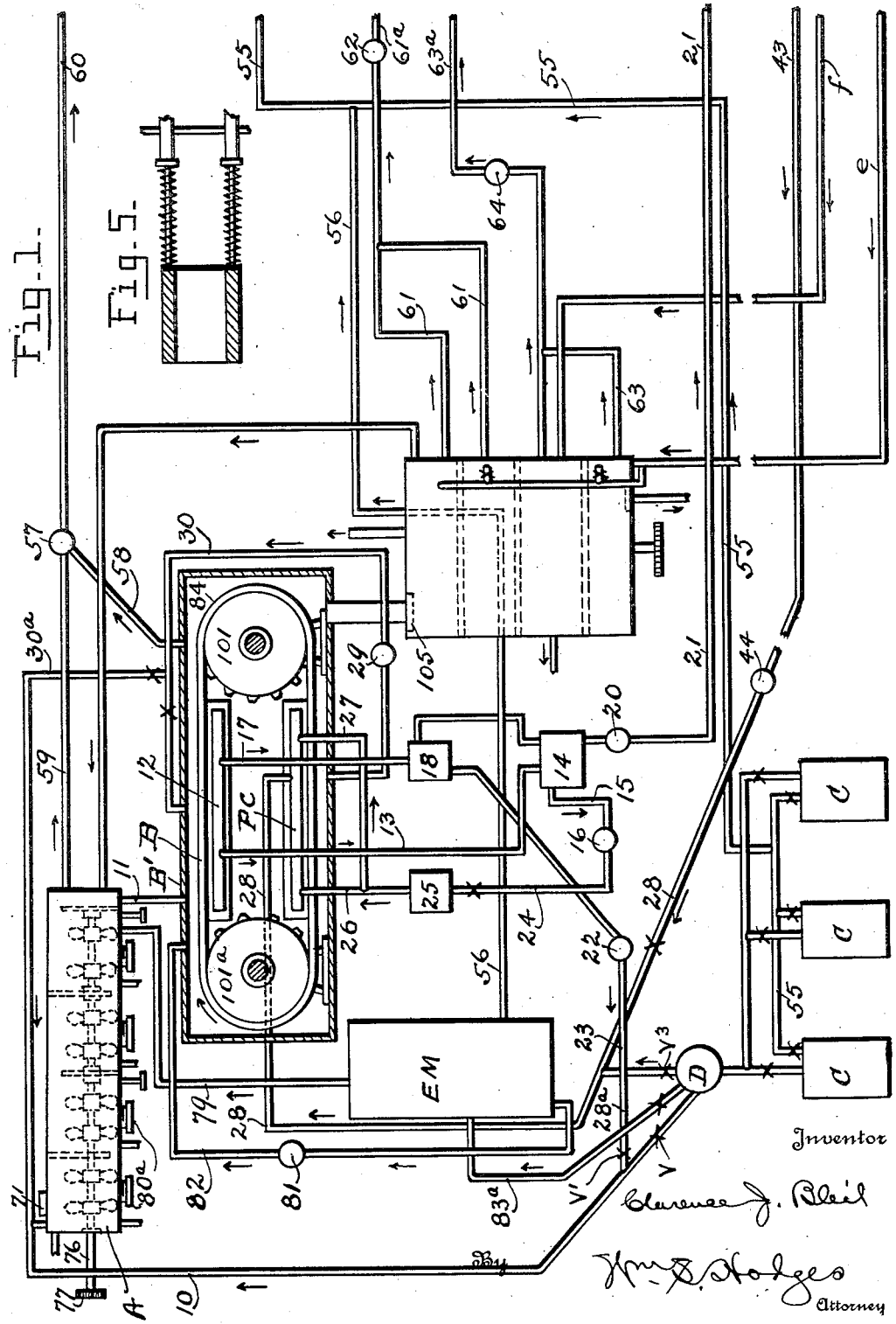

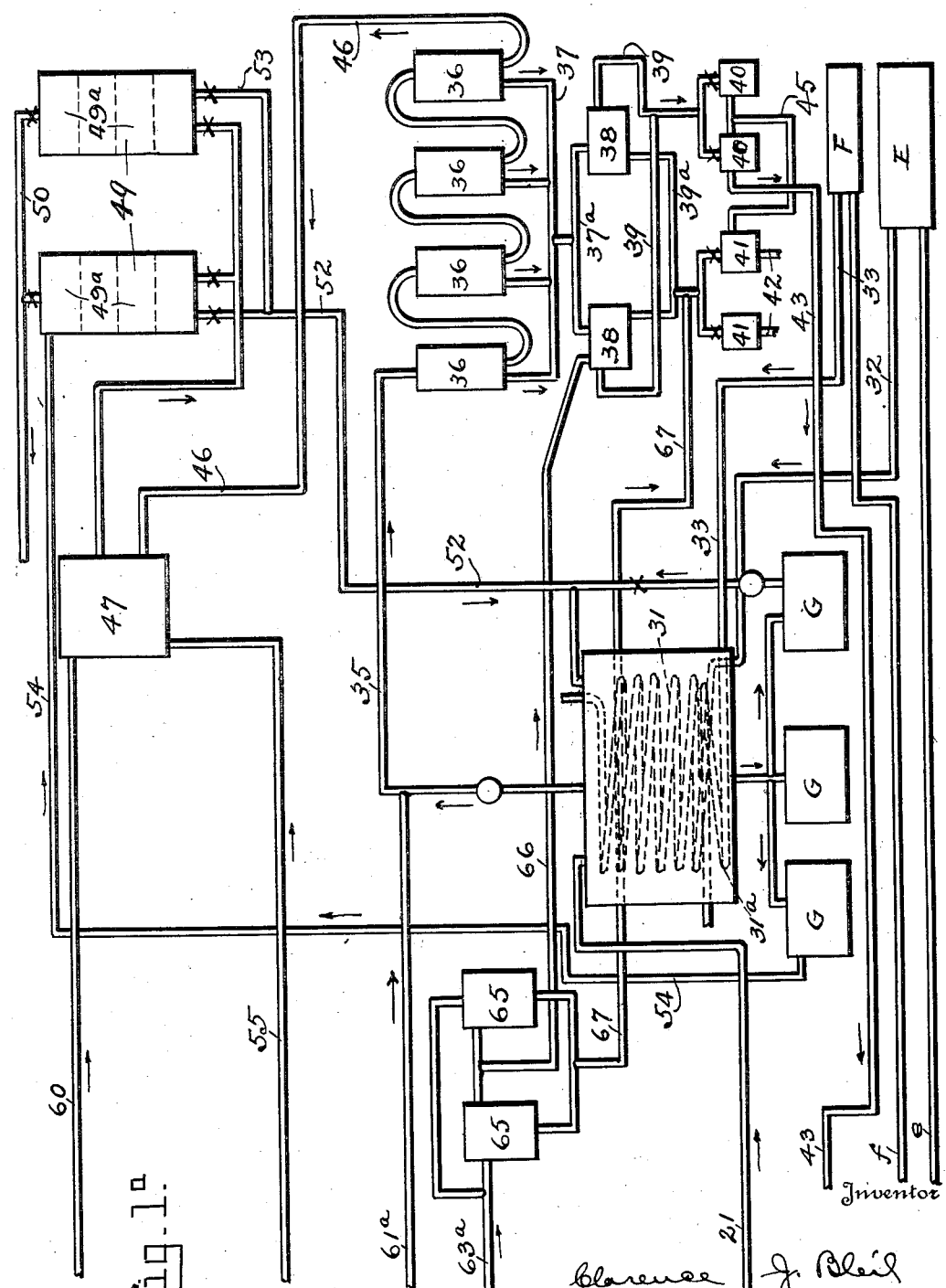

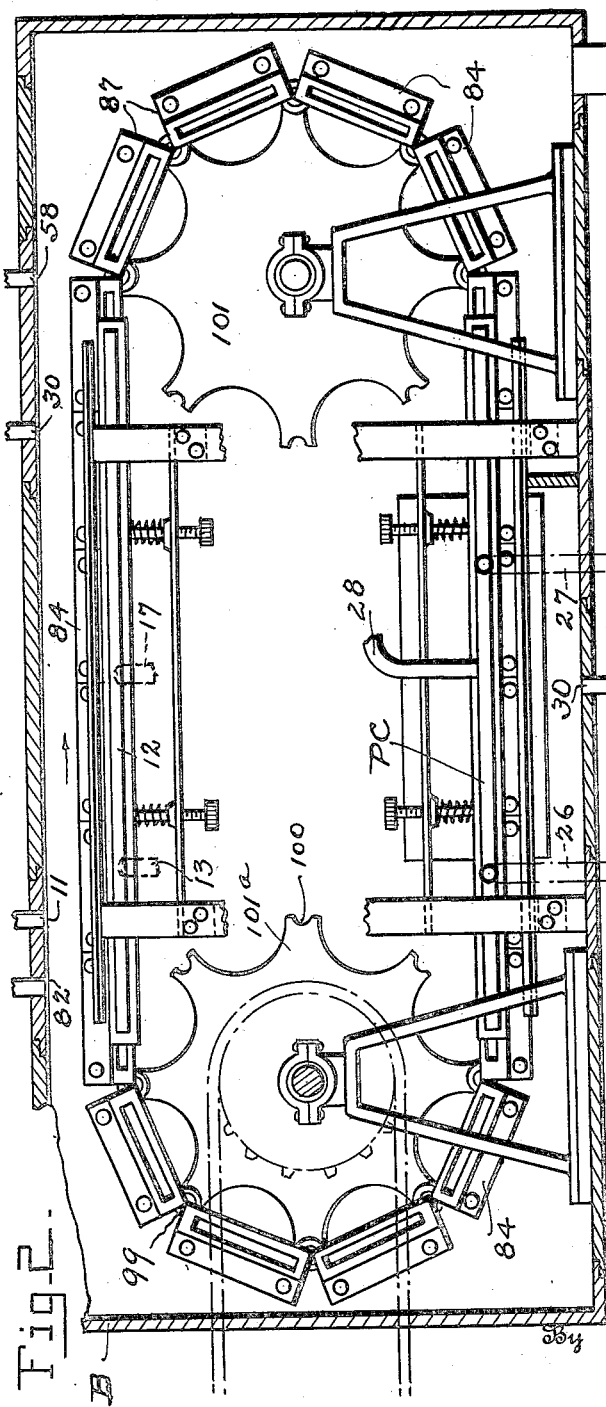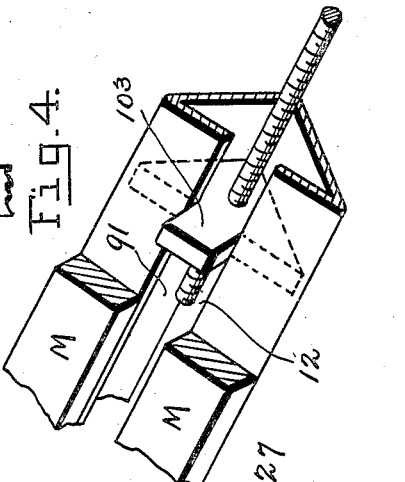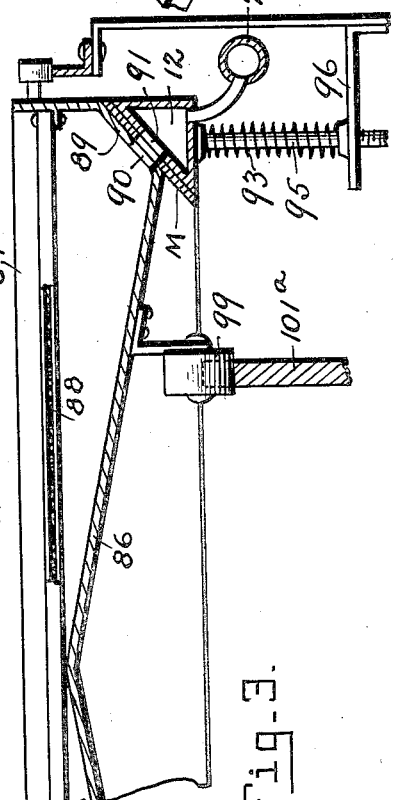

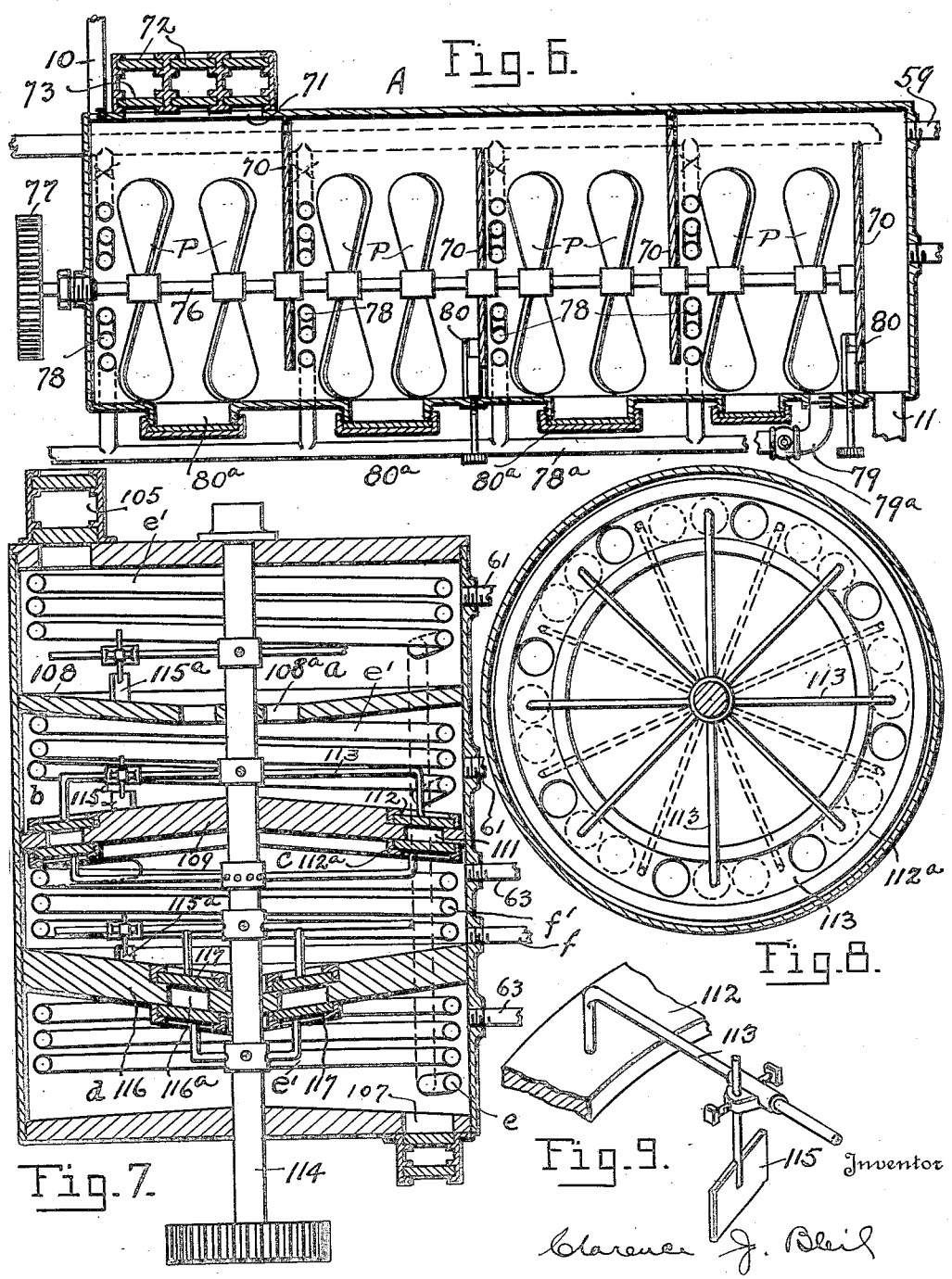

1,791,398

UNITED STATES PATENT OFFICE

CLARENCE J. BLEIL, OF LOS ANGELES, CALIFORNIA

APPARATUS FOR EXTRACTING OILS

Application filed April 12, 1928. Serial No. 269,484.

This invention is an apparatus for extracting oleaginous constituents from seeds, sewage, and other masses of oil containing material.

One of the objects of the invention is to provide for simply, efficiently and continuously subjecting the material to be acted upon, to the action of an oil solvent, and the subsequent filtering of the oil laden solvent from said material, followed by the final separation of the oil and the solvent. A further object is to provide for condensing and recovering gaseous solvent which may be separated from the oil-laden solvent, during the last mentioned separation process. A further object is to provide for continuously delivering mixed solvent and oil-containing material to a continuously operating filter, and to automatically and continuously cleanse the filter of the residue at the end of the filtering stage of the operation, so as to insure the presentation of clean filters for the newly supplied material. A further object is to provide an endless series of filter beds, and means by which the filtering process may be quickened by carrying it on under a vacuum which is maintained during a portion of the travel of the filter beds. A further object is to provide means for quickly and effectively cleaning the filter screens of the major portion of the residue remaining after the filtering action, by means of a current of gaseous solvent forced through the screens from the underside thereof, and removing the same for subsequent drying. A further object is to provide means for subsequently removing any remaining finer particles adhering to the screen, by forcing clean solvent through the screen from the underside and subjecting the mixed material and solvent thus obtained to an additional filtering action. A further object is to provide for the isolation of the weaker filtrate obtained during the latter portion of the period that the material is subjected to the action of the vacuum, and to mix the recovered weak filtrate with new oil bearing material so that the oil bearing content of said filtrate may be increased. A further object is to provide an incorporator for mixing the solvent and the material to be treated, and means for providing an emergency tank to receive any material which may be enclosed within the incorporator, if for any reason the filter or other apparatus should become disabled. A further object is to provide a drier for the residue remaining after the filtering action, and means for extracting and condensing gaseous and liquid solvents which may be given off from said residue during the drying operation.

The invention will be hereinafter set forth and particularly pointed out in the claims.

In the accompanying drawings:—

Figures 1 and 1ª are diagrammatic views illustrating an apparatus for extracting and recovering oils, constructed in accordance with the invention. Figure 2 is a side elevation, and Figure 3 is a detail sectional view illustrating the filter. Figure 4 is a detail view illustrating the valve or member for separating the weaker filtrate from the stronger. Figure 5 is a detail view illustrating the type of valves for maintaining a vacuum in the mixer and the drier respectively. Figure 6 is a longitudinal sectional view illustrating the mixer. Figures 7 and 8 are longitudinal and transverse sectional views respectively of the drier. Figure 9 is a detail view illustrating one of the drier valves.

Referring to Figures 1 and 1ª of the drawing, A designates a mixer adapted to receive the material to be treated. B is the filter enclosed within a vacuum chamber B', and C designates the solvent storage tanks, any number of which may be used. The solvent employed may be any solvent having an affinity for oil, but it is preferred to use a highly volatile hydrocarbon, such for example, as benzol, triple distilled gasoline, etc. The oil bearing material to be operated upon is introduced into the mixer A in a manner to be described in detail later, and solvent is pumped from the tanks C by means of a pump D and introduced into the mixer through the pipe 10, which is controlled by a suitable valve V. The oil bearing material and the solvent are thoroughly intermingled in the mixer and then discharged through a discharge pipe 11, upon the top of the filter B. Said filter is in the form of a plurality of filter sections arranged in an endless train, as indicated in Figures 2 and 3, and will be described in detail later.

Located beneath the upper reach of the filter is a vacuum chamber 12, connected by means of a suction pipe 13, with a vacuum tank 14, and the upper portion of said vacuum tank is connected by a suction pipe 15 with a pump 16. Also connected with the vacuum chamber 12 is a supplemental suction pipe 17, leading to the top of a vacuum tank 18, the upper portion of which communicates with the tank 14, by means of a pipe 19. Any liquid drawn into the vacuum tank 14 is forced by pump 20 through a pipe 21 to the still S. Any liquid in the tank 18 is forced by the pump 22 through pipe 23, back to the pipe 10 so that it may be returned to the mixer A if desired, a valve V' controlling the flow of liquid to said pipe 10. The gases which are drawn into the tank 14 are forced by a pump 16 through a pipe 24 to an equalizing tank 25 and from said tank through branch pipes 26 and 27 to different separated compartments of a pressure chamber P. C. Clear liquid solvent is delivered by the pipe 28, controlled by valve $V^2$, to an intermediate compartment of chamber P. C. Liquid solvent may be delivered directly to pipe 28 from tanks C by means of pump D and a branch pipe $28^a$, which is controlled by a suitable valve $V^3$.

Said pressure chamber P. C. is located above the lower reach of the endless series of filters, so that the pressure of the gases and the solvent will be exerted against the back or under surfaces of the filter screens. The effect of this is to force out of said screens the cake or residue remaining after the filtering operation, the shock of the gases delivered by the pipe 27 serving to dislodge the greater portion of the mass of the residue so that it may drop to a suitable position for ready transfer to the drier D. The clean solvent delivered by the pipe 28 will remove the finer remaining particles so that they may be forced by the pump 29 through a pipe 30 so as to be delivered on the upper reach of the filter on top of the coarser materials, to again go through a filtering operation. Pressure from pipe 26 will blow out the moisture and liquid, together with any remaining solids so that they may be collected in any desired manner for final disposal.

The still S may be of any suitable or desired form, such as that providing for the use of wet steam and super heated steam, the wet steam being supplied to suitable coils 31 by a boiler E and pipe 32. Dry steam may be supplied to a coil $31^a$ within the still and adjacent the bottom thereof, by a super heater F through pipe 33. It will be readily understood that the action of the heat upon the oil-laden solvent is to separate the solvent from the oil, the oil being transferred to the storage tanks G, the lighter solvent being drawn out by a pump 34 through pipe 35 and delivered to a condenser 36 of any desired form. The condensed solvent is drawn through pipes 37 and $37^a$, into a receiving tank 38, and while contained within said tank, a substantial separation of solvent and water will take place. From the tank 38 the solvent is drawn through a pipe 39 to a settling tank 40, and the water is drawn through pipe $39^a$ into a settling tank 41 and from thence through pipes 42 to the sewer or other point of disposal. All solvent that remains in the tank 41 is drawn through the pipes 43 by means of a pump 44 and delivered through the pipe 28 to the pressure chamber P. C. as previously stated. Any solvent which accumulates in the tank 41 may be drawn through the pipe 45 to the tank 40. Any number of tanks 38, 40 and 41 may be employed, but it is preferred to use each form of tank in groups of two or more, controlled by suitable valves, so that one tank may be receiving while the other is settling and emptying.

Any uncondensed gases which may leave the condenser 36 are conducted by a pipe 46 to a receiver 47 and from thence through a pipe 48 into one of a group of scrubbers 49. Said scrubbers may be of any desired type, but preferably contain a certain quantity of oil through which the gases travel upwardly and outwardly to the vent pipe 50, which may discharge into the atmosphere. Two scrubbers are shown, although any number may be employed, it being understood that valves are provided so that but one scrubber is working at a time, and each scrubber is provided with a plurality of transversely disposed screens $49^a$, through which the gases are caused to pass while being brought into contact with the oil. Said screens break up bubbles in such manner as to insure effective mixing of the solvent and oil. The action of the scrubber is to absorb from the gaseous vapor any solvent constituents which may be carried thereby, and when the oil in the scrubbers becomes saturated with solvent to the desired extent, it may be drawn through the pipe 53 and returned to the still S, a new charge of oil being supplied to the scrubbers from the oil tanks through the pipes 52 and 53.

The storage tank G is provided with a vent pipe 54 leading to the scrubbers 49, and the solvent storage tank C and the emergency tank EM are provided with vent pipes 55 and 56, respectively, leading to the receiving chamber 47. By means of this arrangement, any gases venting from the respective tanks may be taken care of through the scrubbers.

As an important safety factor, a pump 57 through the medium of pipes 58 and 59 respectively, draws out of the incorporator A and filter chamber B, any inflammable gaseous vapors which may accumulate and delivers them through the pipe 60 to the receiver 47, where they are mixed with the gases from the condenser and passed through the scrubbers. In this way leakage of inflammable gases to the surrounding atmosphere is minimized.

The drier is provided with a plurality of compartments, some of which are connected by means of pipes 61 with a pump 62 which delivers through pipe $61^a$ into the pipe 35 leading to the condenser 36. The other chambers are connected by means of pipes 63 provided with a pump 64 delivering through pipe $63^a$ to a group of condensers 65, from which the solvent is conducted by means of a pipe 66 to the settling tanks 38, the water being conducted to the tanks 41 by pipe 67.

The mixer A consists of a cylindrical casing which may be supported either horizontally or in a tilted position, but preferably slightly inclined downwardly toward its discharge end. It is divided into a plurality of compartments by baffle plates 70 which are staggered so as to insure that the material moving through the casing shall be caused to travel in a tortuous path. Material is fed through the opening 71 at the top, said opening being controlled in any desired manner that will insure that the material to be operated upon may be placed in the mixer without substantial loss of vacuum. For instance, (referring to Figure 5), two sets of valves 72 and 73 may be mounted one above the other and both normally held to closed positions by springs 74. Cams 75 may be mounted on separate shafts and operated in timed relation so that one of said valves will always be closed while the other is open. Located within the compartments produced by the partitions 70 are paddles P carried by the shaft 76, which extends longitudinally through the mixer and is provided with a suitable power wheel 77 by means of which the shaft may be rotated from a properly connected source of power. The discharge end of the mixer is connected by means of a discharge pipe 11 with the filter chamber, as clearly shown in Figure 1. The various compartments of the mixer may be heated in suitable manner as by means of steam coils 78 connected with a steam pipe $78^a$ which leads from any desired source. The alternate partitions 70 are provided with openings at their lower portions normally closed by valves 80 operable from the outside of the casing, and a manhole or cleaning opening $80^a$ is located immediately beneath each compartment.

If, for any reason, the discharge of the material through the pipe 11 should become in any way impeded, it is important to empty the mixer so as to prevent solidifying of the material therein to such an extent as to make it impossible to rotate the shaft. Under such conditions, the material is delivered through a pipe 79 controlled by a valve $79^a$, to an emergency tank EM. When desired, the material may be drawn from the emergency tank EM by the pump 81 and delivered to the filter through the pipe 82. Thus, the contents of the mixer may be emptied into the emergency tank and held until required. In order to make the contents of the emergency tank sufficiently fluid to insure its ready flow out through the pipe 82, solvent may be drawn from the tanks C and delivered to the emergency tank through the pipe $83^a$ by means of the pump D. Previous to emptying the mixer A into the emergency tank, the valves 80 are operated to uncover the openings in the lower ends of the alternate partitions 70 so that the material may flow directly to the pipes 79.

The filter B comprises a plurality of filter sections 84, each of which consists of a pan-like member provided with side walls 85, and bottom walls 86, the said bottom walls being inclined from the center outwardly. The end walls 87 are preferably formed of a flexible packing material normally unaffected by the action of the solvent, and a filtering screen 88 is supported by each section. By arranging the inclined bottom walls 86 with their highest points at the center, as shown in Figure 3, the central portion of the filter screen is held from sagging during the period that suction is being applied thereto. The end walls 87 are constructed of a material which is sufficiently flexible to insure a maximum conformation of each to the other, of the contacting areas of the end walls of any two adjoining filter sections during horizontal travel of said sections. For instance, the end wall material may be any of the commercial forms of asbestos packing, although the invention is not limited in this particular. By this means, the material which is being deposited upon the filter sections is prevented from dropping in between said sections. Another advantage is that by reason of the flexibility of said walls, a vacuum tight joint may be maintained between contiguous filter sections. The bottom wall of each filter section is provided with an inclined side portion 89, provided with a slot 90 so that it may communicate with a complemental slot 91 formed in a vacuum chamber 12. It will be observed that the walls 86 and 89 converge as clearly shown in Figure 3, and that the slot 90 is located at the lowest point or in the corner formed by the junction of said walls, so that all liquid in the chambers beneath the filter screens will readily drain off into the suction chamber. Said vacuum chamber is adjustably and yieldably supported upon springs 93 encircling rods 95 adjustably mounted in bracket 96 on the frame of the filter and by means of said springs a close vacuum tight sliding contact is maintained between the wall 89 and the correspondingly shaped wall of the vacuum chamber 12. The vacuum is maintained in the chamber 12 through the pipes 13 and 17 as before described. The major portion of the weight of the filter sections is sustained by means of rollers 97 mounted on suitable axles carried by said sections and traveling on tracks 98 secured to the supporting frame. The adjoining ends of sections of the filter are pivotally connected as indicated at 99, and the pivot rods of said connections are positioned to engage correspondingly shaped teeth 100, of sprocket wheels 101, 101ª, the last mentioned sprocket wheel being driven in any desired manner. It will be noted that the wheel 101ª drives the filter sections by a pushing action, so that pressure is maintained tending to force the flexible end walls of the filter sections into engagement with each other, thereby maintaining a close engagement of said walls while the material is being deposited on the sections. Also by means of the pushing action any wear between the filter sections is taken up by forcing the sections toward each other rather than pulling them apart as would be the case if the sections were drawn along instead of being pushed.

It is preferred to divide the vacuum chamber into two or more parts, and this is done by means of one or more valves 103, adjustably mounted upon a rod 104, which extends out of one end of the chamber. By reference to Figure 4, it will be noted for the purpose of illustration, that the valve 103 may be adjusted to any desired position between the pipes 13 and 17, respectively, so that the heavier filtrate will pass to tank 14, and the lighter filtrate will pass to the tank 18. Interposed between the contiguous relative moving surfaces of the walls 89 of the filter sections and the complemental portions of the vacuum chamber is a body M of self lubricating bearing material, such as Somet metal or graphite-impregnated bearing metal, which will reduce the friction of said surfaces and yet maintain a close contact between them. The pressure chamber P. C. is a substantial duplicate of the vacuum chamber 12, and engages the filter sections in identically the same manner. For this reason, it is not considered necessary to repeat the details thereof.

The drier D may be of any desired construction, but in the system illustrated in the drawings, it consists of a cylindrical casing divided into a plurality of chambers by means of suitable partitions indicated in dotted lines. In Figure 1, four of such chambers are shown indicated respectively at $a$, $b$, $c$, and $d$. The filtrate or residue is fed to the chamber $a$ through a feed opening 105 which is closed in suitable manner, as by valves of the type illustrated in Figure 5, so that the material may be intermittently fed to said chamber $a$ without loss of vacuum. Suction is maintained in the chambers $a$ and $b$ by means of the pump 62 acting through the pipes 61. Suction is also maintained in the chambers $c$ and $d$ by the pump 64 acting through the pipes 63. Steam from the super heater F is discharged into chamber $c$ by means of a coil $f'$ supplied from super heater F by pipe $f$. Steam from the boiler E is supplied to coils $e'$ within the chambers $a$, $b$ and $d$ by means of the pipe $e$. The partition walls of the drier are provided with suitably arranged openings and with scrapers so that the material is kept in constant agitation and gradually passes from the top chamber $a$ successively through the chambers $b$, $c$ and $d$ and the outlet 107. The dried material which passes through the drier D is delivered through an outlet opening 107 which is also normally closed by valves similar to those illustrated in Figure 5, which will intermittently permit the discharge from the chamber D without loss of vacuum.

The partition wall 107 of the drier is provided with a downward slope toward the center and is provided with a central opening 108ª. The partition wall 109 is provided with a downward slope from the center outwardly, with openings 111 at the outer edges thereof. Said openings 111 are alternately opened and closed by means of valves 112 which are engaged by guide flanges 112ª, and rotated by arms 113, which are secured to a rotatable shaft 114, which may be power driven in any desired manner. The arms 114 are also preferably provided with scrapers 115, as shown in Figures 7 and 8. The partition 116 is downwardly inclined toward the center and is provided with a plurality of openings 116ª located adjacent to the shaft 114, said openings being controlled by means of valves 117 carried by the arms 113, as shown. Scrapers 115ª are also provided for the partitions 107 and 116.

In practice, it is preferred to finely divide, in suitable manner, any desired oil bearing material and to mix it with any desired quantity of solvent. The mixing of the material and the solvent is effected by introducing them into the mixer or incorporator A at practically the same time, the solvent being intimately mixed with the oil-bearing material by reason of the agitation of the paddles 74, during the passage of the ingredients through the incorporator A. Once the mixer begins to discharge its contents upon the filters, the operation becomes practically continuous. The filter sections are caused to travel by the sprocket wheels so as to be successively presented under the delivery end of the discharge pipe 11, the speed of travel of the filter sections being regulated so that each section will receive only such quantity of the mixture as will insure effective filtering during the travel of the filter sections from the point of deposit to the point where the residue is discharged into the drier D. As the filter sections travel from the pipe 11 to the right, as indicated in Figure 1, the action of gravity upon the liquid in the mixture carried by the filter sections, aided by the suction of the pump 16 draws the oil-laden solvent out of the mixture into the pipes 13 and 17 respectively, the valve 103 having been adjusted so as to divide the vacuum chamber 12 into two sections of the desired relative proportions. It will be observed that the stronger oil-laden filtrate will flow out through pipe 13, whereas the filtrate which flows out through pipe 17 is much weaker as to its oil bearing content.

The filtrate from pipe 13 flows into the tank 14 and the filtrate from pipe 17 flows into tank 18. Any gaseous constituents which may develop in the tank 18 are drawn through the pipe 19 into the tank 14, and the accumulated gaseous constituents from tank 18 and tank 14 are delivered by the pump 16 to the chamber P. C., above those filter sections which constitute the lower reach of the filter, and back of said filter sections. The liquid accumulated in tank 14 is forced by the pump 20 to the still S, where it is subjected to the action of the heat of the steam from boiler E and from super heater F, the oil separating and flowing downwardly out of the still into the storage tanks G, the solvent being driven off in a more or less volatile state.

The volatile solvent is pumped from the still S by means of the pump 34, and delivered to the condenser 36, where the greater portion of the vapor is condensed into a liquid, and the mixed solvent and water later separated by passage through the settling tanks 38, 40 and 41. The liquid solvent thus recovered is pumped through pipe 43 by the pump 44, and delivered through pipe 28 back of the filters between the delivery ends of the pipes 26 and 27. Such gaseous constituents of the distilled vapors as are not condensed are carried through pipe 46, to the receiving chamber 47, and from thence through one or the other of the scrubbers 49. Each scrubber contains a body of oil which in course of time will become saturated with the gaseous solvent passing therethrough, and when the absorption stage is reached the mixed oil and solvent is drained from the scrubber into the still S and redistilled. The scrubbers are supplied with oil by means of pipes 52 and 53 leading from the tanks G to the scrubbers.

The pump 57 maintains a sufficient suction within the filter chamber B and the mixer A, to suck out any inflammable solvent gases which may accumulate in these chambers, and delivers them to the receiver tank 47 to be passed through the oil scrubbers, so that the solvent may be recovered for future use. In this way outward leaks into the atmosphere are greatly minimized and the danger of fire and explosions reduced.

The liquid solvent which is delivered by the pipe 28, and the gases which are delivered by pipes 26, 27 serve to dislodge any fine particles which may be embedded in the filter screens after the initial removal of the major portion of the residue remaining after the filtering operation. The fine particles of the residue together with the liquid solvent mixed therewith are drawn out of the filter casing by the pump 29, and delivered to the top of the filter beds by the pipe 30, so as to be deposited on top of the coarser material which has been previously deposited on the filter sections. In this manner, the finer particles are prevented from working back to a position where they will clog the filter beds. Or, if desired, the material from pipe 30 may be delivered to the mixer through a pipe $30^a$.

The residue discharged by the filter sections is delivered to the drier D through the opening 105. It will be noted that a vacuum is maintained in the sections $a$ and $b$ by means of the pump 62 connected with said chambers by the branch pipes 61. Any vapors which may accumulate in these chambers are delivered by said pump to the pipe 35, so as to be caused to travel through the condenser 36. The contents of the chamber $c$ are heated by the dry steam coil $f'$, and the chamber $d$ the wet steam coil $e'$. Any liquids which accumulate in the said chambers $c$ and $d$ are drawn through the branch pipes 63 by the pump 64, and delivered to condenser 65. The water is separated at this point and is delivered through pipe 67 to the tanks 41, the lighter solvent constituents passing through pipe 66 to the tanks 38. The thoroughly dried and deodorized material in the drier D is discharged through the delivery port 115 to be disposed of in any desired manner.

It is to be understood that although the invention is herein illustrated and described as applied to the art of extracting oils by the use of solvents, it is not limited to this use, the selection of its application to the oil recovery art being solely for the purpose of illustration. In other words, the invention is useful in any art where filtration is necessary and to many other arts not here listed, to which the apparatus covered by the appended claims may be applied.

Having thus explained the nature of the invention and described an operative manner of constructing and using the same, although without attempting to set forth all of the forms in which it may be made, or all of the forms of its use, what is claimed is:—

1. A filter comprising a plurality of movably connected filter sections arranged end to end in an endless train, means for sustaining the weight of said filter sections, a suction chamber having an inclined wall provided with an opening therein, each filter section having an inclined bottom wall provided with an opening adapted to register with the opening in said suction chamber, means for causing said filter sections to travel past the suction chamber so that the inclined walls of the respective filter sections will successively and slidably engage the inclined walls of the suction chamber, and means for yieldably maintaining the suction chamber in engagement with the inclined walls of said filter sections.

2. A filter comprising a plurality of movably connected filter sections arranged end to end in an endless train, means for sustaining the weight of said filter sections, a suction chamber having an inclined wall provided with an opening therein, each filter section having an inclined bottom wall provided with an opening adapted to register with the opening in said suction chamber, means for causing said filter sections to travel past the suction chamber so that the inclined walls of the filter sections will slidably engage the inclined walls of the suction chamber, springs yieldably supporting the suction chamber so as to maintain a close engagement between the inclined wall thereof and the complemental inclined walls of the filter sections, and means for adjusting the position of the suction chamber with respect to the filter sections so as to maintain a close engagement between said walls.

3. A filter apparatus of the character described comprising a plurality of movably connected filter sections arranged end to end in an endless train, each filter section having a liquid discharge opening therein, means for causing the sections to travel in a given direction, means for delivering the material to be filtered to said filter sections as they successively pass a given point, a normally stationary yieldably supported suction chamber positioned to be engaged by each filter section during its travel, said suction chamber having an inlet opening positioned to successively register with the discharge openings of the respective filter sections during a portion of the travel of each section, and means for maintaining a suction within said chamber.

4. A filter apparatus of the character described comprising a plurality of movably connected filter sections arranged end to end, means located at a fixed position for delivering mixture to said filter sections, means for causing said filter sections to travel in a given direction so that they will successively receive said mixture as they pass said fixed position, said filter sections being arranged in an endless train so that they will be successively reversed to remove the main portion of the residue, means for separating the gaseous constituents from the liquid constituents of the filtrate, means for alternately directing said gaseous and liquid constituents to the back of the filter so as to clean the filter sections of any remaining finer particles of residue which may adhere thereto, and means for depositing the finer particles constituting said residue upon coarser material which has been previously deposited upon the filters.

5. A filter apparatus of the character described comprising a plurality of movably connected filter sections arranged end to end in an endless train, means for causing said sections to travel in a given direction, means for supplying material to the filter sections as they successively pass a given point, a suction chamber positioned to be engaged by each filter section during its travel, said suction chamber and said filter sections having openings adapted to register, means for maintaining a suction within said chamber, and means for dividing said suction chamber into separate compartments.

6. A filter apparatus of the character described comprising a plurality of movably connected filter sections arranged end to end in an endless train, means for causing said sections to travel in a given direction, means for supplying material to the filter sections as they successively pass a given point, a suction chamber positioned to be engaged by each filter section during its travel, said suction chamber and said filter section having openings adapted to register, means for maintaining a suction within said chamber, a valve member constructed to divide said suction chamber into separate compartments, and means for adjusting said valve member to vary the relative proportions of said compartments.

7. A filter apparatus of the character described comprising a plurality of movably connected filter sections arranged end to end in an endless train, each filter section having a filter member and inclined bottom walls, and an angularly disposed side portion, said side portion having an outlet opening therein, the inclined bottom walls having their highest point at the center so as to support the adjacent portion of the filter member while suction is being applied to the filter section, a vacuum chamber provided with an inclined wall having slidable contact with the angularly disposed side portions of the respective filter sections, said contacting walls being provided with openings complemental to the first mentioned openings, means for maintaining a suction within said chamber, and means for causing said filter sections to successively travel past said suction chamber.

8. In an apparatus for extracting oleaginous constituents, a filter consisting of a plurality of movably connected sections arranged end to end in an endless train with their end walls normally in contact, said end walls being constructed of a flexible material so that each wall will conform to changes in shape of the wall with which it normally contacts during horizontal travel of said sections, a suction chamber, means for maintaining a suction in said chamber, and means for successively placing the travelling filter sections in communication with said suction chamber.

9. A filter apparatus of the character described comprising a plurality of movably connected filter sections arranged end to end in an endless train so that they will be successively reversed to remove the main portion of the residue, means at a fixed location for delivering mixture to the tops of said filter sections during their travel while in filtering position, means for causing the filter sections to travel in a given direction so that they will successively receive said mixture, a normally fixed suction chamber positioned to be successively engaged by the filter sections during their travel while in filtering position, a normally fixed pressure chamber positioned to be engaged by the successive filter sections during their travel while in reversed position, means connected with the suction chamber for separating the gaseous constituents from the liquid constituents of the filtrate delivered to said suction chamber, means for applying pressure to said gaseous constituents, and means for directing said gaseous constituents to said pressure chamber, so as to clean the reversed filter sections of residue which may adhere thereto.

In testimony whereof I have hereunto set my hand.

CLARENCE J. BLEIL.